(12) United States Patent
Dibene, II et al.

(10) Patent No.: US 8,930,741 B2
(45) Date of Patent: *Jan. 6, 2015

(54) VOLTAGE REGULATOR WITH DRIVE OVERRIDE

(75) Inventors: Joseph T. Dibene, II, Olympia, WA (US); Tomm Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,645

(22) Filed: Dec. 12, 2011

(65) Prior Publication Data

US 2012/0084588 A1 Apr. 5, 2012

Related U.S. Application Data

(63) Continuation of application No. 11/540,075, filed on Sep. 28, 2006, now Pat. No. 8,099,619.

(51) Int. Cl.
| | | |
|---|---|---|
| G06F 1/04 | (2006.01) | |
| G06F 1/12 | (2006.01) | |
| H02M 3/158 | (2006.01) | |
| G06F 1/26 | (2006.01) | |

(52) U.S. Cl.
CPC .............. *G06F 1/26* (2013.01); *H02M 3/1584* (2013.01)
USPC ............ 713/500; 713/501; 713/600; 323/282

(58) Field of Classification Search
CPC .......... G06F 1/263; G06F 1/266; G06F 1/305
USPC .......................... 713/500, 501, 600; 323/282
See application file for complete search history.

(56) References Cited

U.S. PATENT DOCUMENTS

| | | | |
|---|---|---|---|
| 5,324,996 | A | 6/1994 | Mote, Jr. |
| 5,559,553 | A | 9/1996 | Bitek |

(Continued)

FOREIGN PATENT DOCUMENTS

| | | | |
|---|---|---|---|
| JP | 02-055572 A | 4/1990 | |
| JP | 4222455 | 8/1992 | |

(Continued)

OTHER PUBLICATIONS

Office Action received for Chinese Patent Application No. 200780035313.9, mailed on May 13, 2011, 7 pages of Chinese Office Action including 4 pages of English translation.

(Continued)

*Primary Examiner* — Michael J Brown
(74) *Attorney, Agent, or Firm* — Green, Howard & Mughal, LLP

(57) ABSTRACT

Techniques to enable voltage regulators to adjust for coming load changes are presented herein. In some embodiments, a functional block such as a microprocessor core having an associated clock signal is powered by at least one switching-type voltage regulator. When the functional block is about to require an increased level of power, the associated clock is provided to drive the at least one regulator switches overriding their normal drive signal, which has a lower frequency. Thus, the switches are driven at a higher frequency sufficiently prior to (e.g., just ahead of) the load change to reduce the amount of droop that would otherwise occur.

21 Claims, 2 Drawing Sheets

(56) References Cited

U.S. PATENT DOCUMENTS

| | | | |
|---|---|---|---|
| 6,152,613 | A | 11/2000 | Martin et al. |
| 6,184,753 | B1 | 2/2001 | Ishimi et al. |
| 6,243,784 | B1 | 6/2001 | Anderson et al. |
| 6,388,432 | B2 | 5/2002 | Uchida |
| 6,445,230 | B1 | 9/2002 | Rupp et al. |
| 6,473,280 | B1 * | 10/2002 | Buxton et al. ............ 361/18 |
| 6,580,597 | B2 | 6/2003 | Kanouda et al. |
| 6,586,971 | B1 | 7/2003 | Naffziger et al. |
| 6,639,391 | B2 | 10/2003 | Huang et al. |
| 6,643,499 | B1 | 11/2003 | Audinot et al. |
| 6,677,736 | B1 | 1/2004 | Barnes et al. |
| 6,804,793 | B2 | 10/2004 | Josephson et al. |
| 6,828,848 | B2 | 12/2004 | Lee |
| 6,876,239 | B2 | 4/2005 | Bell |
| 6,922,111 | B2 | 7/2005 | Kurd et al. |
| 6,978,388 | B1 | 12/2005 | Cornelius |
| 7,225,349 | B2 | 5/2007 | Tam et al. |
| 7,245,113 | B2 | 7/2007 | Chen et al. |
| 7,345,461 | B2 | 3/2008 | Horiguchi et al. |
| 7,421,604 | B1 | 9/2008 | Mimberg |
| 7,441,137 | B1 | 10/2008 | Mimberg |
| 8,099,619 | B2 * | 1/2012 | Dibene et al. ............ 713/500 |
| 2002/0087896 | A1 | 7/2002 | Cline et al. |
| 2002/0144163 | A1 | 10/2002 | Goodfellow et al. |
| 2003/0112038 | A1 | 6/2003 | Naffziger et al. |
| 2003/0160597 | A1 | 8/2003 | Huang et al. |
| 2003/0201758 | A1 * | 10/2003 | Chen ............ 323/222 |
| 2003/0227335 | A1 | 12/2003 | Ebihara |
| 2004/0119521 | A1 | 6/2004 | Kurd et al. |
| 2004/0125517 | A1 | 7/2004 | Nguyen et al. |
| 2004/0221182 | A1 | 11/2004 | He et al. |
| 2004/0257048 | A1 | 12/2004 | Chagny |
| 2005/0184717 | A1 | 8/2005 | Walters |
| 2006/0006855 | A1 | 1/2006 | Feng et al. |
| 2007/0002593 | A1 | 1/2007 | Dinh |
| 2007/0013080 | A1 | 1/2007 | Dibene |
| 2008/0002312 | A1 | 1/2008 | Dibene |

FOREIGN PATENT DOCUMENTS

| | | |
|---|---|---|
| JP | 662562 | 3/1994 |
| JP | 6311731 | 11/1994 |
| JP | 08-195659 A | 7/1996 |
| JP | 0970620 | 3/1997 |
| JP | 10271883 | 10/1998 |
| JP | 11146302 | 5/1999 |
| JP | 2000-270540 A | 9/2000 |
| JP | 2001-202155 A | 7/2001 |
| JP | 2004-259879 A | 9/2004 |
| JP | 2004-260933 A | 9/2004 |
| JP | 2004-328837 A | 11/2004 |
| JP | 2005-128902 A | 5/2005 |
| JP | 2006-060918 A | 3/2006 |
| JP | 2007-523587 A | 8/2007 |
| KR | 1019960012676 A | 4/1996 |
| KR | 1019980015556 A | 5/1998 |
| KR | 100208353 A | 7/1999 |
| WO | 2005/079486 A2 | 9/2005 |
| WO | 2008/042149 A1 | 4/2008 |

OTHER PUBLICATIONS

Office Action received for Japanese Patent Application No. P2009-525665, mailed on May 30, 2011, 4 pages of Japanese Office Aciton including 2 pages of English Translation.

Office Action received for Chinese Patent Application No. 200780035313.9, mailed on Aug. 31, 2010, 10 pages of Chinese Office Action including 6 pages of English translation.

Office Action received for Taiwan Patnet Application No. 96135925, mailed on Dec. 6, 2010, 7 pages Taiwan Office Action including 1 page of English translation.

Office Action received for Korean Patent Application No. 2009-7006156, mailed on Dec. 24, 2010, 3 pages of English translation.

International Preliminary Report on Patentability received for PCT Application No. PCT/US2007/020622, mailed on Apr. 9, 2009, 6 pages.

International Search Report I Written Opinion for PCT Patent Application No. PCT/US2007/020622, mailed on Mar. 17, 2008, 10 Pages.

Rodriguez, Jorge, et al. "Systems and Methods for Voltage Regulator Communication", U.S. Appl. No. 11/906,008, filed Sep. 29, 2007.

Koertzen, Henry W. "Multi-Cell VOLTA~E Regulator", U.S. Appl. No. 11/957,455, filed Dec. 15, 2007.

Bodas, Devadatta, et al., "Methods and Apparatus to Manage Platform Power Consumption Using an Application Agent", U.S. Appl. No. 11/618,657, filed Dec. 29, 2006.

Office Action received for German Patent Application 11 2007 002 129.2, mailed on Jan. 13, 2012, 5 pages, including 1 page of English translation.

Decision of Refusal mailed Dec. 5, 2011 for Japanese Patent Application No. P2009-525665.

Decision of Refusal issued for Japanese Patent Application No. P2012-086253, mailed Jul. 29, 2013.

Notice of Allowance received for Taiwanese Patent Application No. 096135925, mailed on Sep. 6, 2011, 2 pages of Notice and 1 Page of English Translation.

Notice of Allowance received for Korean Patent Application No. 1020097006156, mailed on May 1, 2012, 2 Pages of Notice and 1 Page of English Translation.

Notice of Allowance received for Chinese Patent Application No. 200780035313.9, mailed on Sep. 1, 2011, 2 Pages of Notice and 2 Pages of English Translation.

Notice of Allowance received for Japanese Patent Application No. 2009-525665, mailed on Jul. 12, 2013, 2 Pages of Notice and 2 Pages of English Translation.

First Office Action received for Japanese Patent Application No. 2012-086253, mailed on Mar. 4, 2013, 3 Pages of Office Action and 3 Pages of English Translation.

* cited by examiner

US 8,930,741 B2

VOLTAGE REGULATOR WITH DRIVE OVERRIDE

CROSS-REFERENCE TO RELATED APPLICATION

This application is a Continuation of, and claims priority to and incorporates by reference, the corresponding U.S. patent application Ser. No. 11/540,075, filed on Sep. 28, 2006, entitled "VOLTAGE REGULATOR WITH DRIVE OVERRIDE" and issued as U.S. Pat. No. 8,099,619 on Jan. 17, 2012.

BACKGROUND

Integrated circuits such as microprocessors are becoming more complex, operating under tighter performance parameters and at the same time being asked to operate; more efficiently under tighter performance parameters. They are typically powered by one or more voltage regulator (VR) circuits that provide a regulated supply voltage. Because a microprocessor's load demand can vary dramatically and quickly, it can be challenging to provide VR solutions that are capable of providing adequate supplies in such environments. Accordingly, improved VR solutions may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Techniques to enable voltage regulators to adjust for coming load changes are presented herein. In some embodiments, a functional block such as a microprocessor core having an associated clock signal is powered by at least one switching-type voltage regulator. When the functional block is about to require an increased level of power, the associated clock is provided to drive the at least one regulator switches, overriding their normal drive signal, which has a lower frequency. Thus, the switches are driven at a higher frequency sufficiently prior to (e.g., just ahead of) the load change to reduce the amount of droop that would otherwise occur.

Figure 1:
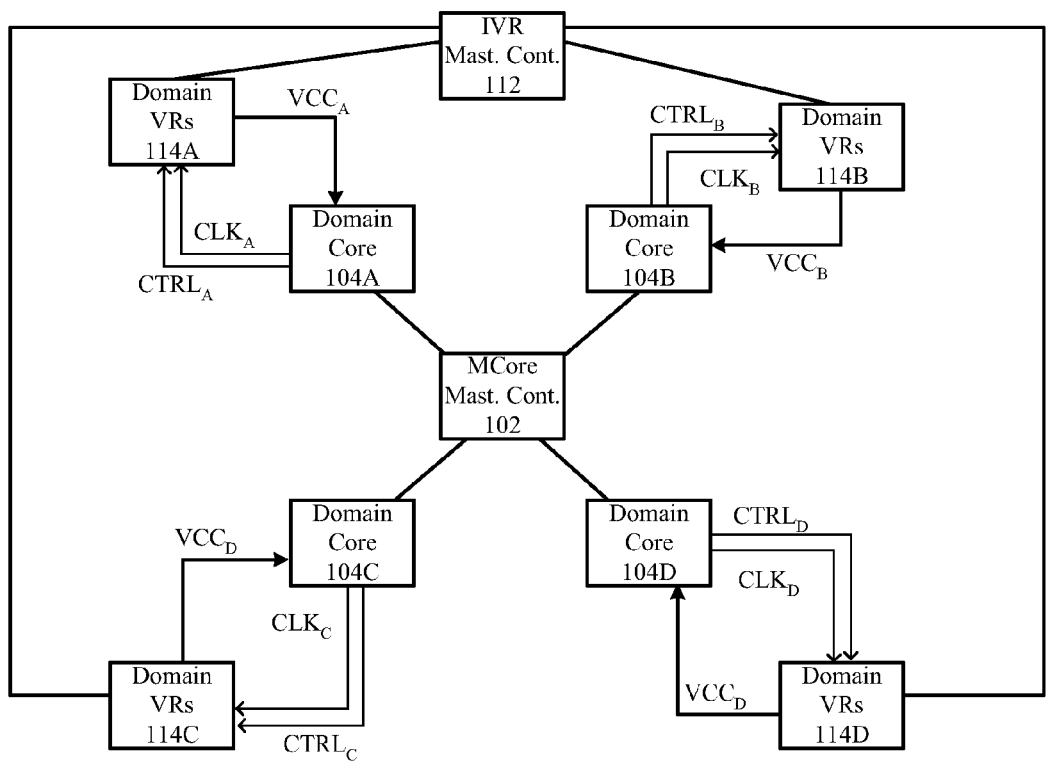
FIG. 1 is a block diagram of a multi-core microprocessor system with an associated VR system in accordance with some embodiments.

FIG. 1 generally shows a multi-core microprocessor with an integrated voltage regulator (IVR) system having voltage regulators with clock override capabilities in accordance with some embodiments. The microprocessor comprises four domain cores (104A to 104D) coupled to a common multi-core master controller 102 to perform different supervisory tasks such as work load allocation, environment management and the like. In some embodiments, the domain cores 104 and master controller 102 are part of a common microprocessor die.

The depicted voltage regulator system comprises four domain VR sub-systems (domain VRs 114A to 114D), one for each domain core 104, and a master controller 112 coupled to each of the domain VRs. Each of the domain VRs 114 is coupled to an associated domain core 104 to provide it with a regulated supply voltage VCC and to receive from it a core clock signal (CLK) and an override control signal (CTRL). For example, domain VRs 114A provides to domain core 104A a supply voltage $VCC_A$ and receives from it a clock signal $CLK_A$ and override control signal $CTRL_A$. (Note, in alternative embodiments, the override control signals could come from the Master Controller or from some other source, aware, either directly or indirectly, of an impending load change that would cause a droop on a voltage regulator domain.)

Each of the domain VRs 114 comprises one or more separate voltage regulators selectably coupled together so that different VR combinations can be engaged to selectably provide different current levels depending upon load demand. For example, one of the domain VRs might actually comprise eight separate VRs, each with a current capability of 3 Amps, coupled together in parallel to provide from 0 to 24 Amps depending on the needs of its domain core load. The separate VRs may be coupled together or they may be distributed about the core to be coupled to a supply rail at different locations, e.g., spread evenly across a core. In some embodiments, the domain VRs 114 are part of a common integrated VR (IVR) die separate from the multi-core processor die containing domain cores 104. However, it should be appreciated that the voltage regulators and domain cores or associated domain VRs and cores may be on the same chip or on different combinations of chips.

Figure 2:
FIG. 2 is cross-sectional view of a microprocessor integrated circuit package in accordance with some embodiments.

With reference to FIG. 2, a cross-sectional view of a multi-core microprocessor integrated circuit (IC) package is shown. It comprises an integrated voltage regulator (IVR) die 202 and a multi-core microprocessor die 204. The IVR die 202 is embedded within a package substrate 201, while the microprocessor die is mounted to the substrate 201 and against the IVR die 202 for efficient signal conductivity. (Note that the dies may or may not actually contact one another. They may have one or more other materials sandwiched between them throughout some or all of their abutting surface portions. Such materials could be used for structural stability, heat transfer purposes, or the like.)

The IVR die 202 may comprise one or more domain VRs, while the microprocessor die 204 may comprise one or more domain cores, as described above. With this package configuration, with the dies mounted next to one another, circuit elements for VR domains can be disposed more proximal to their associated domain core elements. This can allow for sufficient conductive paths (e.g., via solder bumps or other contacts) to conduct relatively large amounts of current to the domain cores. (It should be appreciated that any suitable package configuration using one or more dies to implement the domain cores and VRs may be implemented and are within the scope of the present invention. For example, the IVR die could be "atop" the microprocessor die instead of "below" it. Alternatively it could be next to it, partially against it, or they could be part of the same die.)

Figure 3:
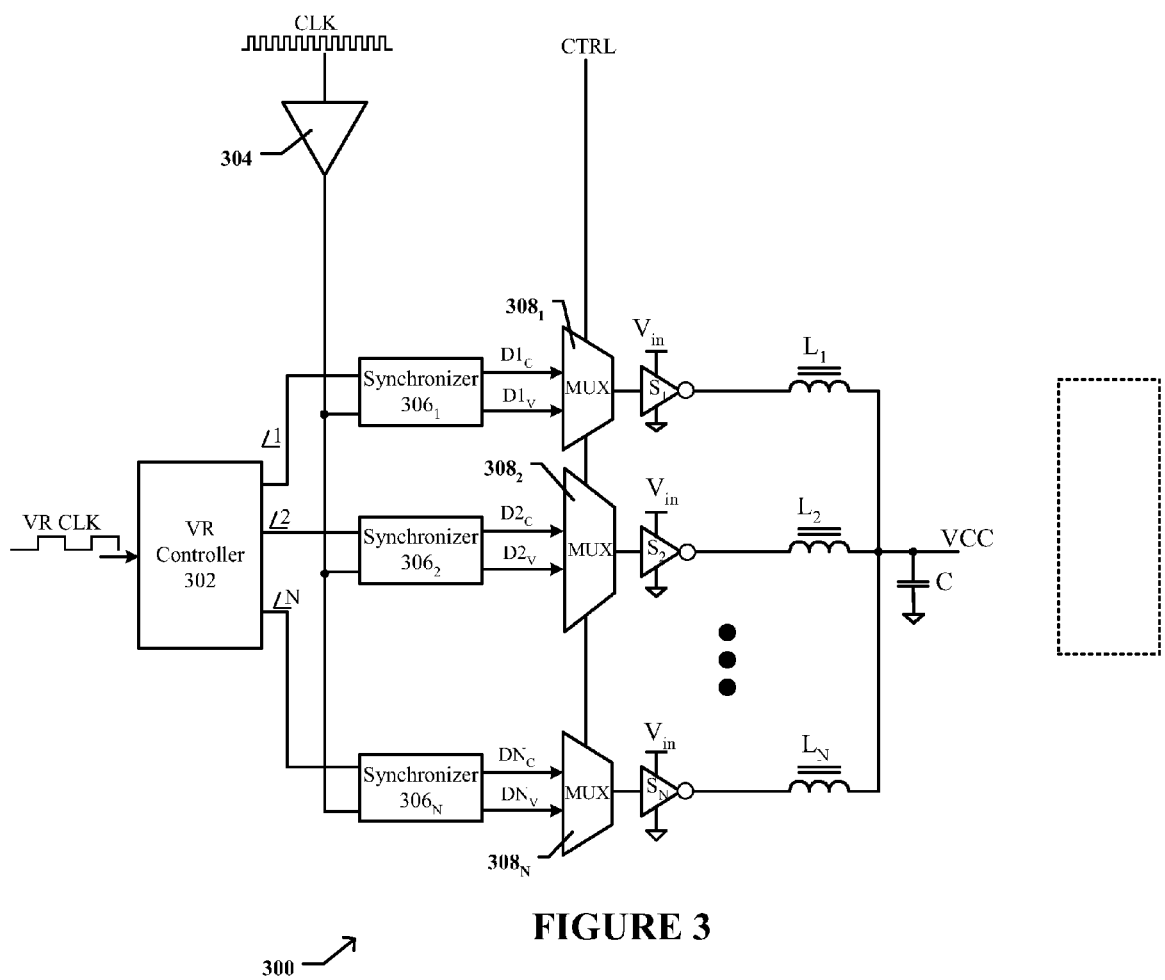
FIG. 3 is a schematic diagram of a voltage regulator circuit with a clock override cap ability in accordance with some embodiments.

With reference to FIG. 3, an exemplary voltage regulator circuit 300 with a clock override capability is depicted. Voltage regulator 300 is a multi-phase (N-phase) switching regulator with N switch ($S_1$ to $S_N$) sections and N output sections comprising inductors $L_1$ to $L_N$, coupled together at a common output (VCC) at decoupling capacitor C. The switches ($S_1$ to $S_N$) are shown generally for simplicity and may comprise any suitable circuit elements such as driver devices and push, pull, or push-pull configured transistors, as are well known in the art. Likewise, inductors L1 to LN may comprise any suitable combination of inductors and/or transformers, coupled, at least to some degree, together for improved efficiency. For example, in some embodiments, they may be implemented with inductors coupled together with magnetic material fabricated within the IVR die housing VR 300.

Voltage regulator 300 also comprises VR controller 302, core clock driver 304, synchronizer circuits $306_1$ to $306_N$, and 2:1 multiplexers $308_1$ to $308_N$, coupled together as indicated. The VR controller 302 receives a clock signal (VR CLK) and produces from it N drive signals ($\angle 1$ to $\angle N$) appropriately phase-shifted from one another to drive switches $S_1$ to $S_N$ to generate the regulated output voltage VCC. The VR clock signal may be a conventional clock signal with a suitable frequency (e.g., in the range of from 10 MHz. to 250 MHz.) for the efficient generation of VCC. The drive signals will typically have the same frequency as that of VR CLK but this is not required, e.g., they may be derived from a divided or multiplied version of VR CLK. As is known in the art, VR controller 302 controls the duty cycles of the drive signals to increase or lower the amount of current provided to the load in order to regulate VCC.

The separate drive signals are each provided to an associated synchronizer circuit $306_i$, which also receives a core clock (Core CLK) signal from an associated core (e.g., the core being powered by the voltage regulator 300). The frequency of the Core CLK signal will typically be greater than the frequency (or frequencies) of the drive signals, e.g., from 4 to 20 times greater. Each synchronizer circuit $306_i$ synchronizes the edges of its incoming drive and core clock signal and provides as outputs first and second in-phase drive signals ($D_C$ and $D_V$) but with the frequency of $Di_C$ being greater than $Di_V$. The synchronizer circuits 306 may be formed from any suitable combination of circuit elements including but not limited to phase locked loops, delay locked loops, logic gates and the like. The drive signals ($Di_C$, $Di_V$) from each synchronizer circuit are fed into a an associated 2:1 multiplexer 308$i$, whose output is then provided to an associated one of the switches $S_i$. A control signal (CTRL), e.g., from the associated core is also provided to each multiplexer 308 serving as the control to select either the $D_V$ drive signal or faster $D_C$ drive signal. (Note that in some embodiments, the core clock signal may not necessarily be provided to its synchronizer at all times. For example, it could be gated and disabled under appropriate conditions to save power. In this case, the synchronizer should then have appropriate circuitry to pass the drive signal through to its associated multiplexer, or equivalent, even if the core clock is not being applied.)

In operation, the slower $D_V$ drive signals (multi-phases) are normally selected for steady-state operation and operate in accordance with known techniques and methodologies. Thus, the core control signal normally controls the multiplexers to select the $D_V$ drive signals. On the other hand, when the core is about to demand additional power (e.g., because a logic section is about to be engaged), the core control signal causes the multiplexers to select the core drive signals ($D_C$) instead of the slower VR drive signals ($D_V$). In some embodiments, the faster core clock drive are activated for an amount of time that is sufficiently long to thwart an unreasonable droop in VCC but sufficiently short to avoid instability. In some embodiments, the core clock drive signals are activated only for load changes that are sufficient to cause an unreasonable droop. That is, it is not engaged for minor load changes. In addition, the control signal may come from a source other than from a core processor. For example, it could come from a controller, aware that the load on the voltage regulator is about to increase.

Figure 4:
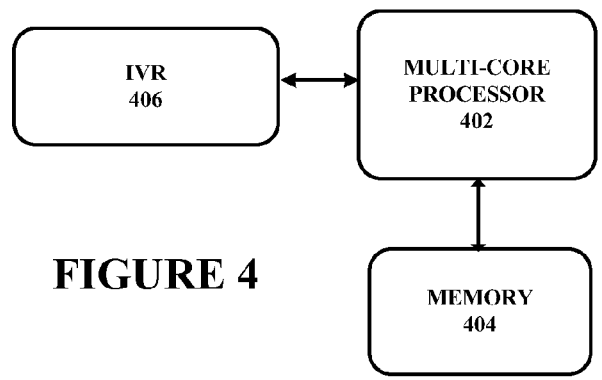
FIG. 4 is a block diagram of a computer system having a multi-core microprocessor coupled to an integrated voltage regulator in accordance with some embodiments.

With reference to FIG. 4, one example of a computer system is shown. The depicted system generally comprises a multi-core processor 402 that is coupled to a integrated voltage regulator 404, and memory 406. In some embodiments, the processor 402 and IVR 404 may be configured as discussed above. The computer system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus comprising:
    a switching voltage regulator to be switched with a drive signal derived from a voltage regulator clock signal, the voltage regulator to provide a voltage supply to a functional circuit having an associated functional clock signal having a higher frequency than that of the voltage regulator clock signal; and
    synchronization circuit to synchronize the functional clock signal with the voltage regulator clock signal,
    wherein the synchronization circuit provides a first drive signal derived from the voltage regulator clock signal and a second drive signal derived from the functional clock signal, the first and second drive signals being in edge synchronization with one another, and
    wherein the second drive signal has a higher frequency than the first drive signal.

2. The apparatus of claim 1, wherein the functional circuit is a microprocessor core.

3. The apparatus of claim 2, wherein the microprocessor core issues the control signal when a load of the microprocessor core receiving the power supply is about to increase.

4. The apparatus of claim 2, wherein the microprocessor core issues a control signal a the load receiving the power supply is to increase above a threshold.

5. The apparatus of claim 1, wherein the drive signal to be derived from the functional clock signal in response to a control signal from the functional circuit when the functional circuit is about to require an increased level of power.

6. The apparatus of claim 1, wherein the switching voltage regulator is a multi-phase switching type voltage regulator, and wherein the drive signal comprises multiple drive signals out of phase with respect to one another.

7. The apparatus of claim 1, wherein the switching voltage regulator and the functional circuit are part of a common integrated circuit package.

8. The apparatus of claim 1, wherein the functional circuit and at least part of the switching voltage regulator are on separate dies.

9. The apparatus of claim 1, wherein the drive signal is to be derived from the functional clock signal for a sufficiently small amount of time so as to maintain stability.

10. An apparatus comprising:
a switching voltage regulator having at least one switch to generate an output voltage to be provided to a functional circuit, the at least one switch to be driven by a drive signal derived from a clock signal of the functional circuit to inhibit droop in the output voltage when the functional circuit is about to require increased level of power but has not yet increased the level of power, otherwise the at least one switch of the switching voltage regulator to be driven by a drive signal derived from a periodic clock signal of the switching voltage regulator which has a frequency lower than the frequency of the drive signal.

11. The apparatus of claim 10, wherein the functional circuit is a microprocessor core.

12. The apparatus of claim 11, wherein the microprocessor core issues a control signal to the switching voltage regulator to engage the drive signal derived from the clock signal of the functional circuit when a load of the microprocessor core receiving the output voltage will increase.

13. The apparatus of claim 12, wherein the microprocessor core issues the control signal when the load of the microprocessor core is to require the increased current.

14. The apparatus of claim 10, further comprising a synchronization circuit to synchronize the drive signal with a signal normally used to drive the at least one switch.

15. The apparatus of claim 14, wherein the synchronization circuit to provide the drive signal derived from the clock signal of the functional circuit, and to provide the drive signal derived from the periodic clock signal of the switching voltage regulator, the respective drive signals being in edge synchronization with respect to one another.

16. The apparatus of claim 10, wherein the switching voltage regulator and functional circuit are part of a common integrated circuit package.

17. The apparatus of claim 16, wherein the functional circuit and at least part of the switching voltage regulator are on separate dies.

18. The apparatus of claim 10, wherein the drive signal, derived from the clock signal of the function circuit or derived from the periodic clock signal from the switching voltage regulator, is to be active at any given time for a sufficiently small amount of time to maintain stability.

19. A system comprising:
a voltage regulator domain having voltage regulators coupled to a common supply output to provide a regulated voltage, the voltage regulators to switch using a drive signal derived from a voltage regulator clock signal, wherein the voltage regulator clock signal is a periodic clock signal;
a processor core coupled to the voltage regulator domain to receive the regulated voltage,
wherein the voltage regulator domain to operate using the drive signal derived from a clock signal from the processor core, the clock signal from the processor core having a frequency higher than that of the voltage regulator clock signal to inhibit unreasonable droops in the regulated voltage when the processor core is about to require an increased level of power but has not yet increased the level of power; and
a memory device coupled to the processor core to provide it with external system memory.

20. The system of claim 19, further comprising a power supply coupled to the voltage regulator domain to provide it with power.

21. The system of claim 19, further comprising a controller to control the voltage regulator domain to be driven by the clock signal from the processor core instead of the voltage regulator clock signal when load of the processor core is to sufficiently increase.

* * * * *